United States Patent
Checchio et al.

[19]

[11] Patent Number: 5,912,951
[45] Date of Patent: Jun. 15, 1999

[54] VOICE MAIL SYSTEM WITH MULTI-RETRIEVAL MAILBOXES

[75] Inventors: Robert A. Checchio, Dunellen; Steven T. Kaish, Bridgewater; Nancy A. Kowalsky, Long Branch; Margaret H. Redberg, Red Bank; Gregory C. Sheehan, Toms River, all of N.J.

[73] Assignee: AT&T Corp, Middletown, N.J.

[21] Appl. No.: 08/839,333

[22] Filed: Apr. 17, 1997

[51] Int. Cl.$^6$ .................................................. H04M 1/64
[52] U.S. Cl. ........................................ 379/88.22; 379/67.1
[58] Field of Search ............................... 379/67.1, 72, 73, 379/76, 79, 88.18, 88.22, 88.25, 88.28

[56] References Cited

U.S. PATENT DOCUMENTS

| | | | |
|---|---|---|---|
| 4,375,083 | 2/1983 | Maxemchuk | 379/667 |
| 4,706,270 | 11/1987 | Astegiano et al. | 379/71 |
| 5,414,757 | 5/1995 | Thompson | 379/88.27 X |
| 5,479,411 | 12/1995 | Klein | 379/88 |
| 5,781,186 | 7/1998 | Jennings | 345/302 |

*Primary Examiner*—Scott Weaver

[57] ABSTRACT

A voice mail system voice mail mailbox having a message container storing a plurality of messages and a pointer indicating a message in the message container. The pointer is initially set to point to a first message in the message container. A first user accesses the voice mail mailbox. At the same time, or any time thereafter, a second user also accesses the voice mail mailbox. Responsive to a command from the first user, the first message is played to the first user. The pointer is then updated to point to a second message in the message container. Responsive to a command from the second user, the second message is played to the second user, simultaneously with the first message being played to the first user.

10 Claims, 8 Drawing Sheets

VOICE MAIL SYSTEM WITH MULTI-RETRIEVAL MAILBOXES

FIELD OF THE INVENTION

The present invention relates to a voice mail system in which multiple messages can be retrieved from a single mailbox at the same time.

BACKGROUND OF THE INVENTION

Voice mail systems allow multiple callers to leave messages in a called party's mailbox when the called party cannot answer a telephone call. Called parties are frequently unable to retrieve and delete messages from the mailbox as quickly as they are deposited, thus requiring voice mailboxes to have the ability to retain multiple messages. For example, calls to an ordering desk are rerouted to a voice mail system during peak calling periods, when all order takers are busy. Since called parties attach financial value to incoming calls, called parties frequently ask for voice mailboxes with enough message capacity to capture all incoming calls during a peak calling period, intending to retrieve the messages when incoming calling volume subsides. Retrieved messages are then deleted, making room for new messages. A typical large mailbox can store 60 minutes of messages, although larger mailboxes are becoming available.

Figure 1:
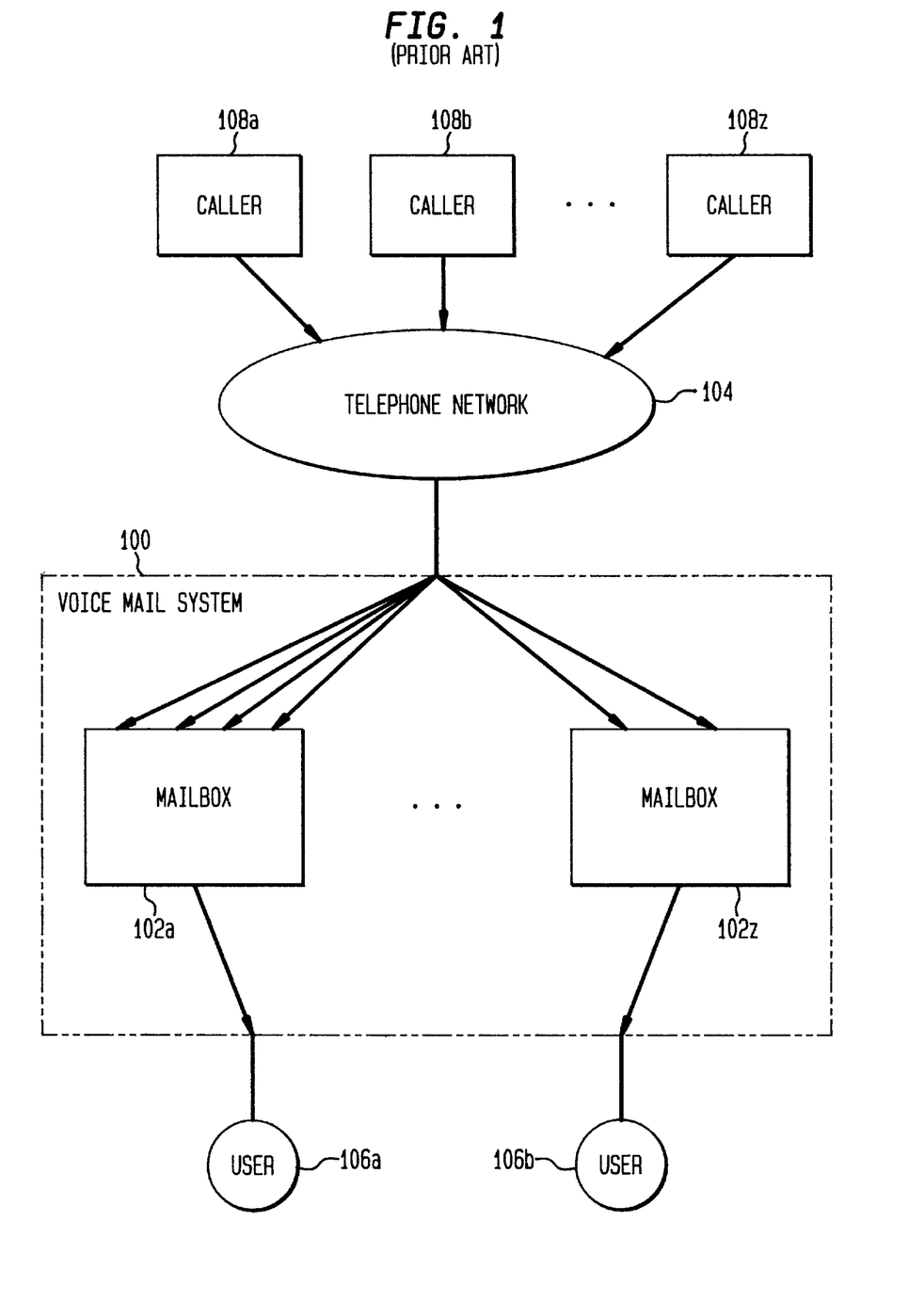
FIG. 1 is a block diagram of a prior art voice mail system 100.

A problem arises with current voice mail systems. Current systems use a mailbox "locking" system that allows each mailbox to be accessed by only a single individual at a time. Mailbox locking is necessary in conventional voice mail systems because conventional mailboxes can only play one message at a time. For example, a prior art voice mail system 100 is shown in FIG. 1. Callers 108a–z call in to voice mail system 100 through telephone network 104 and leave messages in one or more mailboxes 102a–z. Multiple callers may simultaneously leave messages in a single mailbox, such as 102a. However, prior art systems allow only one user at a time to retrieve a message from mailbox 102a because each mailbox can only play one message at a time.

A called party accesses a mailbox by dialing into the voice mail system, either directly, in the case of an in-house system, or through the telephone network, in the case of centralized network systems. The user then supplies a mailbox number and password. The user then gets exclusive access to the mailbox—the mailbox cannot be accessed by anyone else while the user is accessing the mailbox. In addition to only allowing one user access, only one message can be played to that one user at a time. Thus, messages must be retrieved sequentially in time, overlapping or concurrent retrieval is not possible. As a result, company that uses a voice mail system to capture calls during peak calling periods can employ only one employee to retrieve messages during slow periods, even if multiple employees are available to retrieve messages. This has a negative impact on productivity. Furthermore, the user retrieving the messages must listen to all of the messages sequentially, so it takes the user one hour to listen to 60 one minute messages, even if the messages were deposited over a very short time interval. Although some systems allow high priority messages to be presented to the called party first, this merely changes the order of the sequence, not its length. The length of time to retrieve and delete messages keeps a user busy for a long period of time, and creates the chance that the mailbox will still have messages in it when a new peak calling period begins. The situation is exacerbated by improvements in storage technology which will make it possible to create mailboxes with many hours of message storage. A need arises for a voice mail system in which multiple messages can be retrieved from a single mailbox at the same time.

SUMMARY OF THE INVENTION

The present invention is a voice mail system in which multiple messages can be retrieved from a single mailbox at the same time. This improves staff productivity, and will allow voice mail systems to take advantage of improvements in technology that increase message storage capacity.

The voice mail system of the present invention comprises a voice mail mailbox including a plurality of messages and a pointer indicating a message in the mailbox. The pointer is set to point to a first message in the voice mail mailbox. The first message is played to a first user, responsive to a command from the first user. The pointer is updated to point to a second message in the voice mail mailbox. At least a portion of the second message is played to the second user, while the first message is being played to the first user, responsive to a command from the second user.

BRIEF DESCRIPTION OF THE DRAWINGS

The details of the present invention, both as to its structure and operation, can best be understood by referring to the accompanying drawings, in which like reference numbers and designations refer to like elements.

FIG. 3b is a more detailed block diagram of controller 304, which is shown in FIG. 3a.

DETAILED DESCRIPTION OF THE INVENTION

Figure 2:
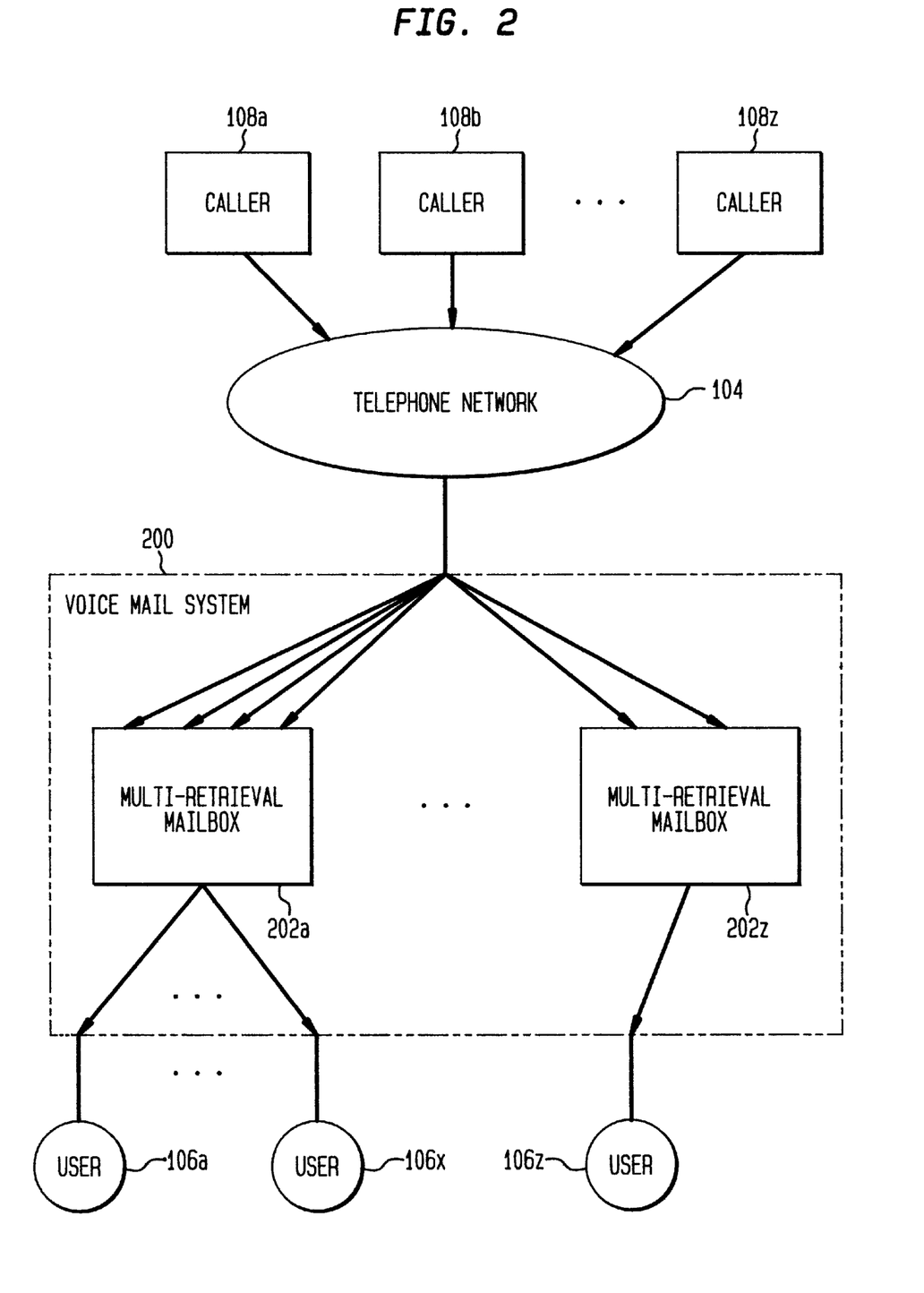
FIG. 2 is an exemplary block diagram of a voice mail system 200 having multi-retrieval mailboxes, in accordance with the present invention.

A voice mail system 200, in accordance with the present invention, is shown in FIG. 2. Multiple callers 108a–z call in to voice mail system 200 through telephone network 104 and leave messages in one or more mailboxes 102a–z. Multiple callers may simultaneously leave messages in a mailbox, such as 202a. However, in contrast to the prior art, the mailboxes of the present invention are multi-retrieval mailboxes. Multiple users, such as 106a–x, may retrieve multiple messages from the same multi-retrieval mailbox at the same time. Voice mail system 200 includes a plurality of multi-retrieval mailboxes, so that multiple groups of multiple users may concurrently access more than one mailbox.

Figure 3A:
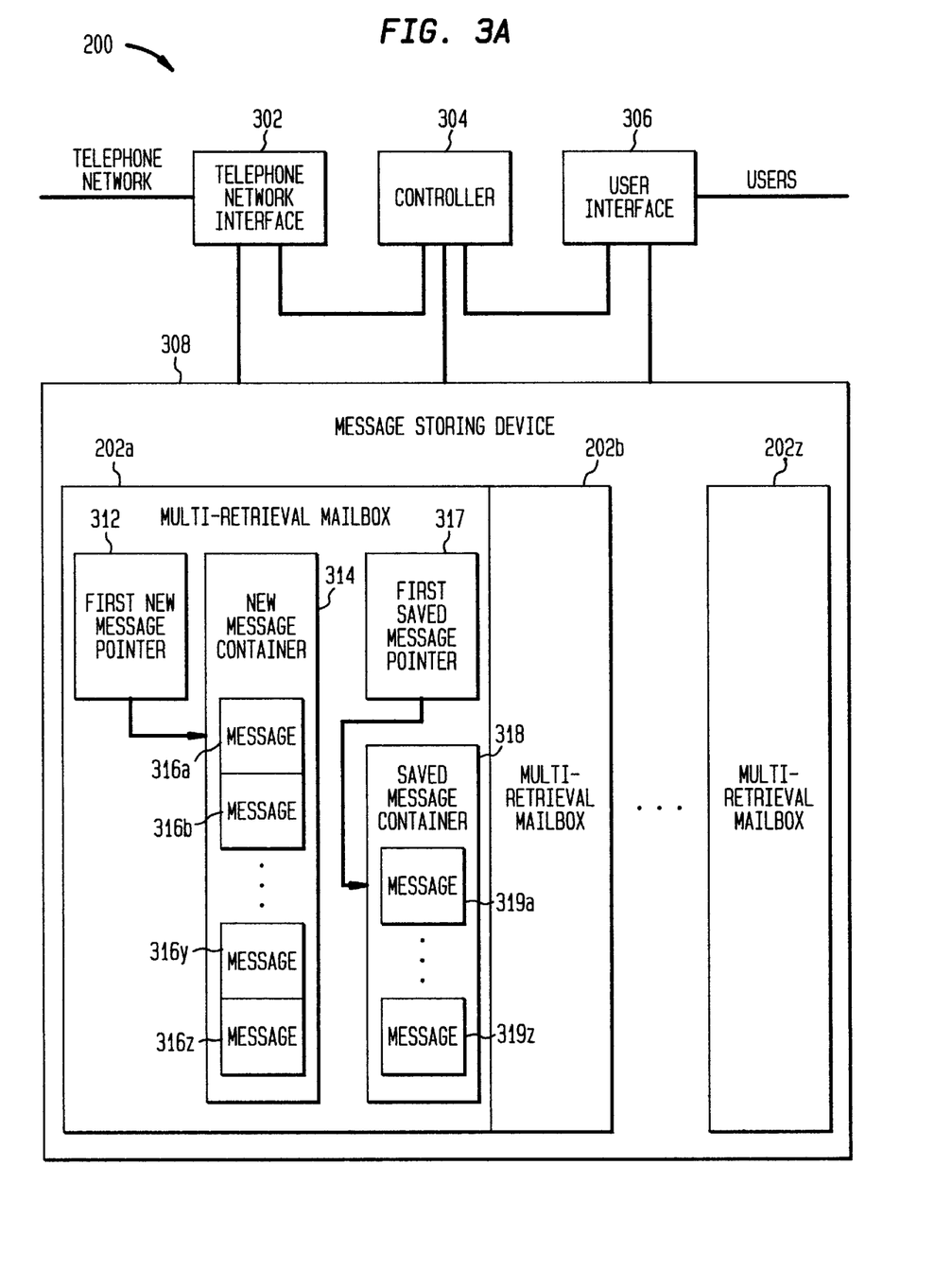
FIG. 3a is a more detailed block diagram of voice mail system 200, shown in FIG. 2.

Voice mail system 200, of FIG. 2, is shown in more detail in FIG. 3. Voice mail system 200 includes a telephone network interface 302, a controller 304, a user interface 306 and a message storage device 308. Telephone network interface 302 is coupled to the telephone network and handles incoming calls from callers. Interface 302 is also coupled to controller 304 and message storage device 308. As controlled by controller 304, interface 302 answers incoming calls, plays prompts to callers, accepts commands from callers, processes incoming voice messages to a form suitable for storage and transmits the processed messages to message storage device 308, in which the messages are stored. User interface 306 is coupled to users of the voice mail system, to controller 304 and to message storage device 308. User interface 306, under the control of controller 304, accepts retrieval calls from users, plays prompts to users, accepts commands from users, receives voice messages retrieved from message storage device 308 and plays the retrieved messages to users. As is well-known, telephone network interface 302 and user interface 306 may be combined into a single device, especially in those systems where users access the voice mail system through the telephone network.

Message storage device 308 includes a plurality of multi-retrieval mailboxes 202a–z. Each mailbox includes a new message container 314, which may hold one or more messages 316a–z. New message container 314 stores message which have not yet been played by any user. Generally, messages are placed in and retrieved from new message container 314 in the order they are received, thus new message container 314 constitutes a first-in, first-out queue. Message order in the queue may be affected by the use of priority-messaging. As is well known, priority-messaging systems may place later-received higher-priority messages in the container ahead of lower-priority messages which were received earlier. When priority-messaging is in use, messages are grouped in the container first in order of priority, then, within each priority grouping, in the order received.

Multi-retrieval mailbox 202a includes first new message pointer (FNMP) 312. FNMP 312 is used exclusively to retrieve messages and always points to the next message which is to be retrieved. Prior art voice mail systems do not have a pointer like the FNMP, they simply play whichever message is at the head of the queue to the single allowed user. FNMP 312 allows multiple users to access multiple messages in the same mailbox at the same time. When a first user accesses a mailbox and commands a message be played, the message which is played is the message to which FNMP 312 is pointing. Once the message begins to play, FNMP 312 is modified to point to the next message in the new message container. A second user may access the mailbox while the first message is playing and command a second message be played. The second message is the message to which FNNP 312 is pointing. At least a portion of the second message is played while the first message is still playing. Once the second message begins to play, FNMP 312 is modified to point to the next message in the new message container. A third user, etc., may access the mailbox to play the next message. Alternatively, a user already accessing the mailbox, such as the first user, whose message has finished playing, may play the next message. This scheme is capable of accommodating any number of concurrent users and any number of messages being played concurrently. Of course, the number of concurrent users may be limited by other factors, such as hardware limitations on the number of messages which can be played concurrently, etc.

Multi-retrieval mailbox 202a also includes a saved message container 318 and a first saved message pointer (FSMP) 317. Saved message container 318 is similar to new message container 314, but stores saved messages 319a–z, which were in new message container 314, but have been played by a user and saved. A user playing a message from new message container 314 has the option of deleting or saving the message after it has been played. If the user chooses to save the message, it is stored in saved message container 318. FSMP 317 allows multiple messages to be concurrently played from saved message container 318 similarly to the way in which messages are played from new message container 314. Controller 304 of FIG. 3a is shown in more detail in FIG. 3b. Processor 350 executes program instructions which implement the functions of the present invention. Telephone network interface adapter 352 connects to telephone network interface 302 of FIG. 3a and communicates the signals necessary for controller 304 to control interface 302. Likewise, user interface adapter 354 connects to user interface 306 of FIG. 3a and communicates the signals necessary for controller 304 to control interface 306. Memory 356 is accessible by processor 350 and stores program instructions and data necessary for the operation of processor 350. These devices are all coupled by bus 353.

Figure 3B:
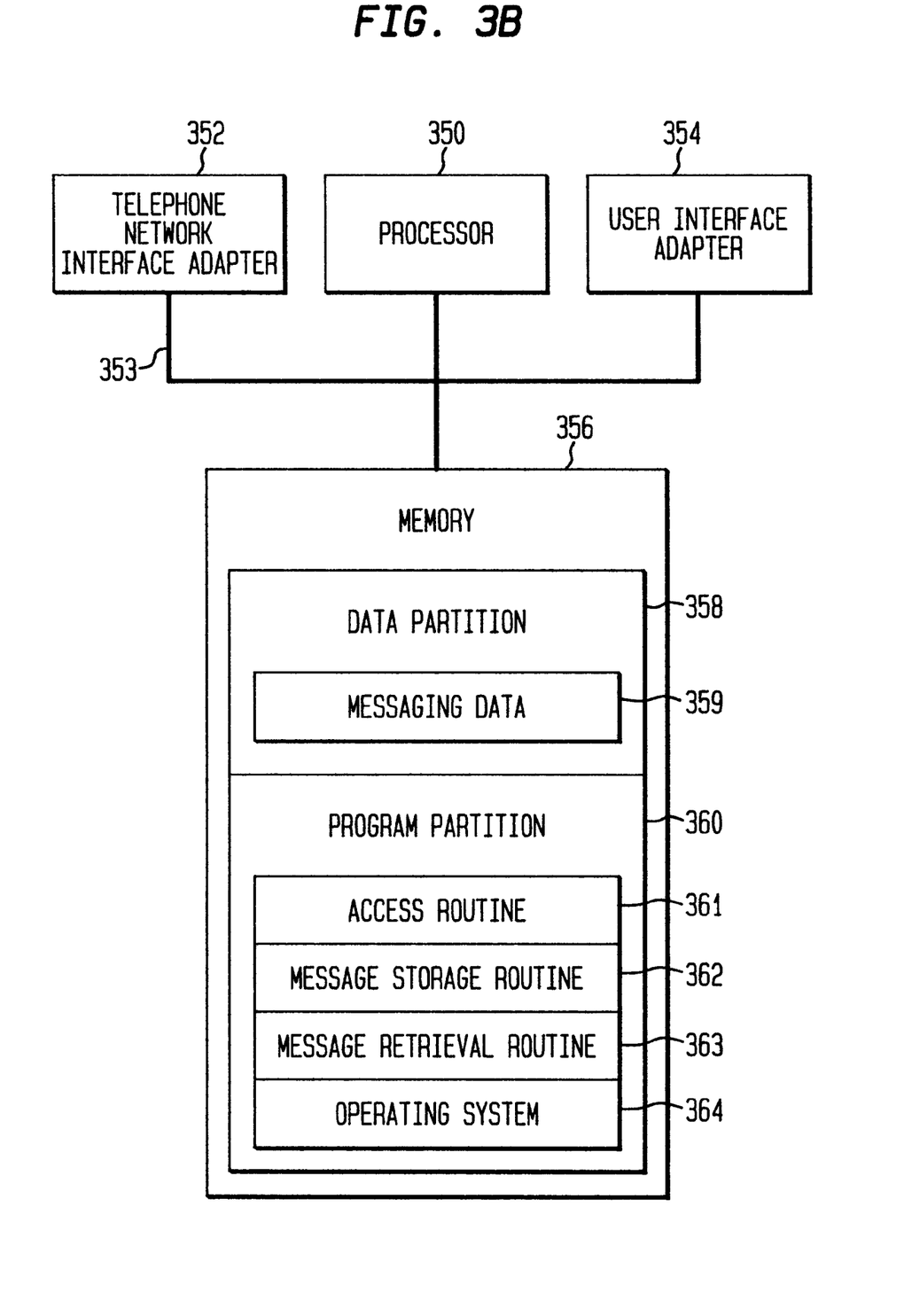

Memory 356 may be one or more of a number of well-known devices, such as random access memory, read-only memory, erasable read-only memory, hard disk drives, floppy disk drives, tape drives, optical drives, etc. Memory 356 includes program partition 360. Access routine 361 implements the process which allows callers and users to access the voice mail system. Message storage routine 362 implements the process which allows messages to be stored in the voice mail system. Message retrieval routine implements the retrieval process, shown in FIG. 4, which allows multiple users to concurrently access a mailbox. Data partition 358 includes messaging data 359, which is used by processor 350 in carrying out the program routines. For example, messaging data includes identifiers of mailboxes, such as mailbox number, passwords for mailboxes, etc.

FIGS. 3a and 3b show memory 356 as distinct from message storage device 308. Message storage device 308 may be any analog or digital storage device capable of storing voice messages in distinct locations. In a preferred embodiment, a hard disk drive is used to store voice messages in digitized form. Each digitized voice message may be stored as a separate file, providing distinct and easily accessible locations for each message. The data necessary to manage the message containers and the first new message pointers are also stored on the hard disk drive or random access memory. Likewise, in this embodiment, much of the contents of memory 356 is stored in one or more files on the same hard disk drive, with the remainder of the contents of memory 356 stored in random access memory for immediate access by processor 350. The precise organization of the files and data structures are implementation details which are within the skill of one skilled in the art.

Other embodiments are also possible. For example, the messages may be stored several separate tape drives. In this embodiment, the data necessary to manage the message containers and the first new message pointers are also stored on the hard disk drive or random access memory. The data stored would, of course, refer to locations on the tape drive. Other equivalent embodiments may also be envisioned based on tradeoffs between the throughput and the cost of the messaging system.

Figure 4:
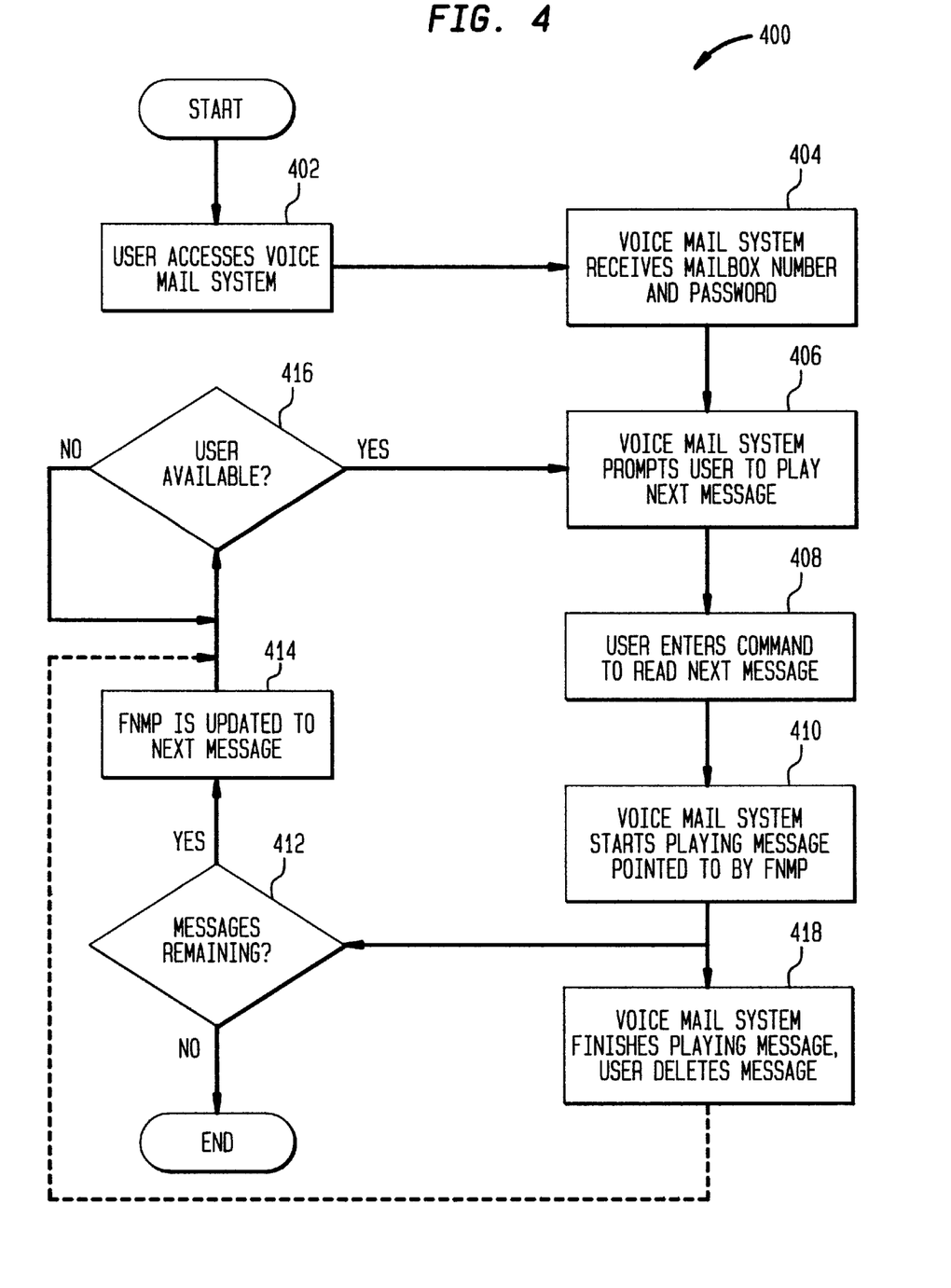
FIG. 4 is a flow diagram of a multi-user message retrieval process 400, implemented in voice mail system 200.

FIG. 4 shows the retrieval process in more detail. FIG. 4 is best understood when viewed in conjunction with FIGS. 5a–f. Although FIG. 4 and FIGS. 5a–f show the retrieval of message from new message container 314 of FIG. 3, the process of retrieving messages from saved message container 318 is similar. In step 402, a user accesses the voice mail system. Typically, the user does this by dialing an access code or by pressing a special function button on a telephone set The voice mail system answers the access call and a connection to the user is established. In step 404, the voice mail system receives number of the mailbox to be accessed and a password used to ensure that only authorized users access the mailbox. The mailbox number may be sent to the voice mail system in a variety of ways. In some system, each access code corresponds to a particular mailbox number, thus the mailbox number is inherent in the access code used. In other systems, the mailbox number may be sent to the voice mail system when a special function button on a telephone set is pressed. In such systems, the mailbox number sent is based on the particular set on which the button is pressed, or on the line to which the telephone set is connected. In still other systems, the voice mail system prompts the user to enter a mailbox number. In general, most systems prompt the user to enter a password after the mailbox has been selected.

In step 406, the voice mail system prompts the user to play the next message. Typically, this prompt is a voice recording, but other indicators, such as tones or lights, may be used instead. In step 408, the user enters a command to the voice mail system to play a new message. Typically, such commands are entered by the user pressing one or more touch-tone keys or special-function buttons on the telephone set. However, some systems may use voice recognition to respond to voice commands issued by the user. In step 410, the voice mail system accesses the mailbox indicated by the information received in step 404. The FNMP for that mailbox is accessed and the message indicated by the FNMP is selected. The voice mail system then starts playing the message. When the message has completed playing, the user is prompted to delete the message.

Figure 5A:
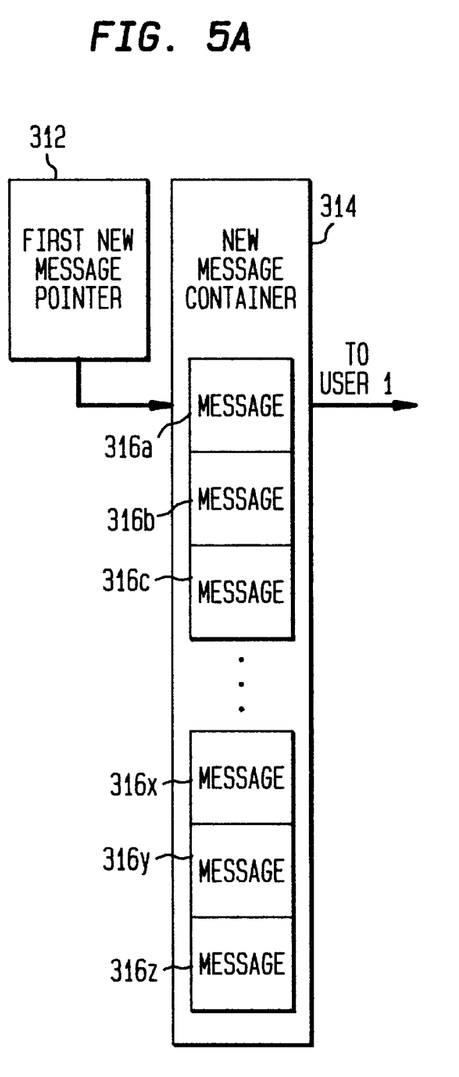
FIG. 5a is a block diagram of a new message container 314, shown in FIG. 3, before first new message pointer 312 has been updated, while playing a message to a first user.

Referring briefly to FIG. 5a, new message container 314 and FNMP 312 are shown immediately after performance of step 410 of FIG. 4. A first user, User1, has accessed the system and commanded that a message be played. The message played is the one pointed to by FNMP 312, which is message 316a. The message has begun being played to User1, as indicated by the arrow to User1.

After step 410, the retrieval process continues on two paths. The process continues with step 418, in which the voice mail system finishes playing the message to the user. The user is then prompted to dispose of the message. Typically, the disposal comprises simply deleting the message. However, other well-known voice mail functions may be performed, such as saving or forwarding the message. In any case, the message is deleted from container 314, although it may be stored elsewhere in the voice mail system. This path of the process is now completed and the user has become available to play another message. The user's availability is indicated by the dashed line which goes to step 416, which is a step which depends upon user availability.

The other path from step 410 leads to step 412. As soon as a message is selected and before it has completed playing, it is determined, in step 412, whether any messages remain in the container. If not, the mailbox is empty and the process ends. If so, the process continues with step 414, in which the FNMP is updated to point to the next message in the container.

Figure 5B:
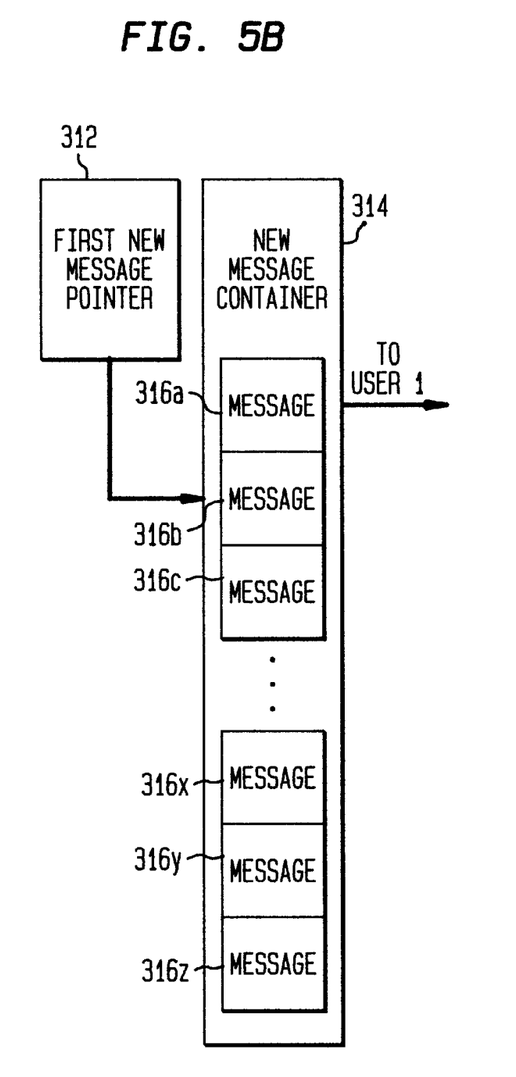
FIG. 5b is a block diagram of a new message container 314, shown in FIG. 3, after first new message pointer 312 has been updated, while playing a message to a first user.

Referring briefly to FIG. 5b, new message container 314 and FNMP 312 are shown immediately after performance of step 414 of FIG. 4. FNMP 312 has been updated to point to the next message in the container, which is message 316b. Message 316a continues to be played to User1.

In step 418, it is determined whether a user is available to listen to a message. This is the case where a user has just accessed the system or where a user has just finished listening to and deleting a message. If no users are available, the system waits for one to become available. When a user is available, the process continues with step 406, in which the voice mail system prompts the available user to play the next message.

Process 400 can accommodate a plurality of concurrent users of the same mailbox. Each user accesses the system, enters the same mailbox number and enters the loop of steps 406 to 418. As soon as any user becomes available, that user is prompted to play the next message, which is always the message indicated by the FNMP.

Figure 5C:
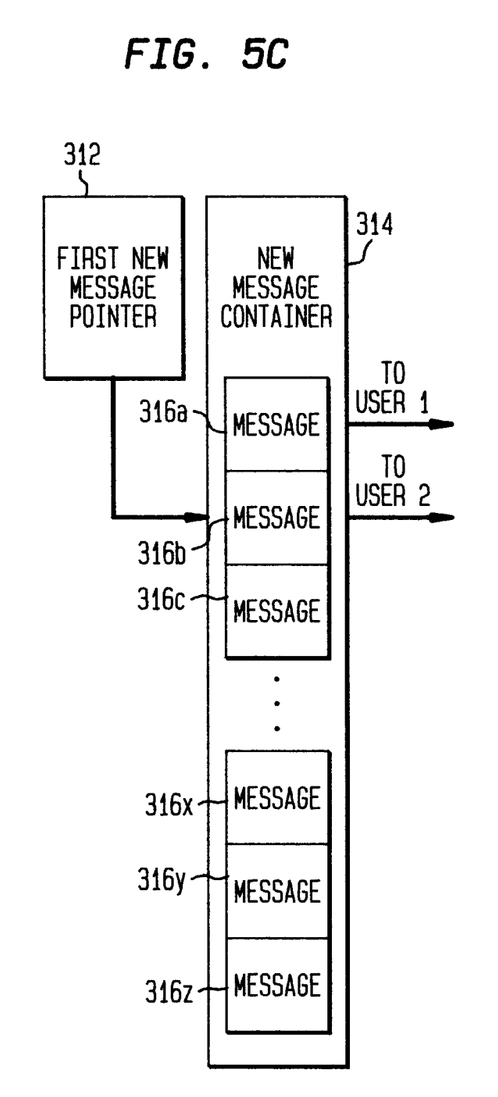
FIG. 5c is a block diagram of a new message container 314, shown in FIG. 3, before first new message pointer 312 has been updated, while playing a first message to a first user and a second message to a second user.

Referring briefly to FIG. 5c, new message container 314 and FNMP 312 are shown immediately after performance of step 410 of FIG. 4 for a second user, User2. User2 has accessed the voice mail system and commanded that a message be played. The message played is that pointed to by FNMP 312, which is message 316b. Two message are being played at the same time, message 316a to User1 and message 316b to User2.

Figure 5D:
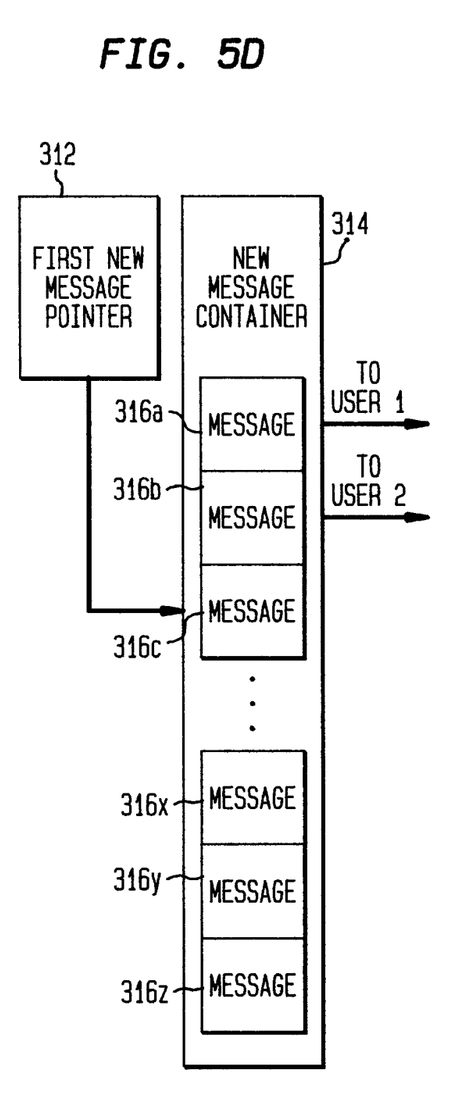
FIG. 5d is a block diagram of a new message container 314, shown in FIG. 3, after first new message pointer 312 has been updated, while playing a first message to a first user and a second message to a second user.

Turning to FIG. 5d, new message container 314 and FNMP 312 are shown immediately after performance of step 414 of FIG. 4 when two message are being played. FNMP 312 has been updated to point to the next message in the container, which is message 316c. Message 316a continues to be played to User1 and message 316b continues to be played to User2

Figure 5E:
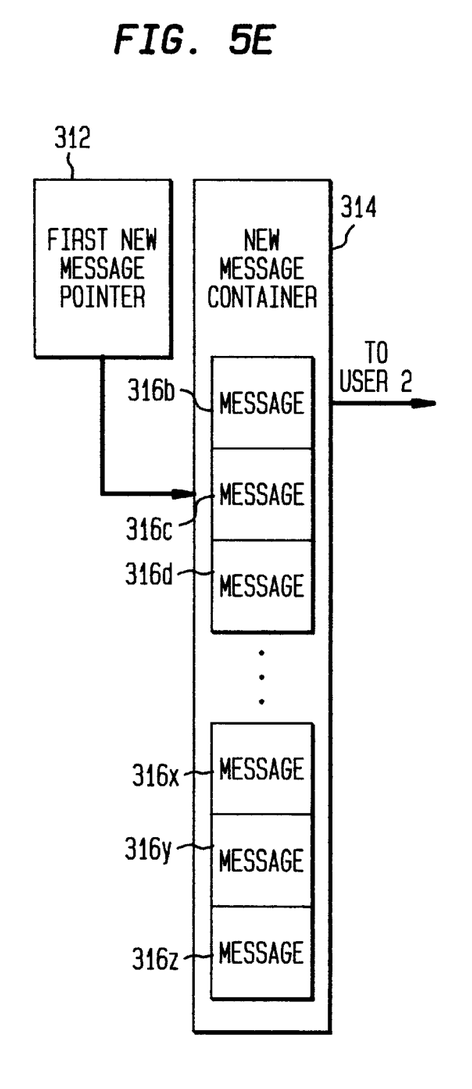
FIG. 5e is a block diagram of a new message container 314, shown in FIG. 3, after a first message to a first user has completed playing and while a second message to a second user is still playing.

Turning now to FIG. 5e, new message container 314 and FNMP 312 are shown after step 418 of FIG. 4. Message 316a has completed being played to User1. User1 has commanded that message 316a be deleted, so message 316a is no longer present in new message container 314. Message 316b is now the first message in container 314, but message 316b continues to be played to User2. In a typical container implementation, the messages in the container are not actually moved, but rather pointers which are internal to the container are adjusted. The management of such containers is well-known to those of skill in the art and is unrelated to the operation of FNMP 312, which always indicates the next message which is to be played, regardless of the location of that message in the container.

Figure 5F:
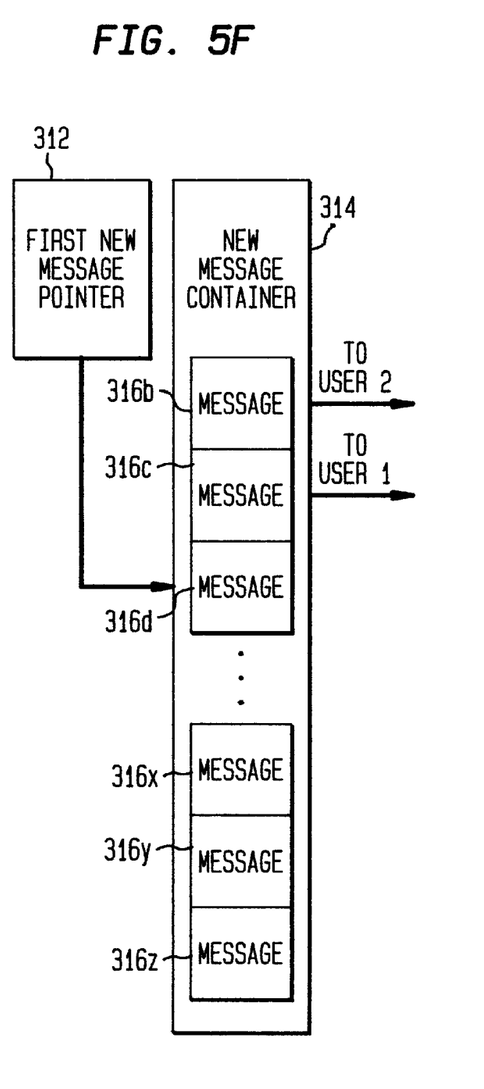
FIG. 5f is a block diagram of a new message container 314, shown in FIG. 3, after first new message pointer 312 has been updated, while playing a second message to a second user and a third message to a first user.

Because User1 has completed listening to message 104a, User1 is now available to listen to another message. As seen in FIG. 4, the retrieval process recognizes the availability of User1 in step 416 and continues with step 406. In step 406 of FIG. 4, User1 is prompted to play the next message. In step 408, User1 commands the next message be played and in step 410, the voice mail system begins playing the next message. The message played the message indicated by FNMP 312, which is message 316c, as shown in FIG. 5e. In step 412, it is determined that message remain in the container, so, in step 414, the FNMP is updated. Turning to FIG. 5f and referring to FIG. 4, new message container 314 and FNMP 312 are shown immediately after performance of step 414 of FIG. 4. FNMP 312 has been updated to point to the next message, which is message 316d. Message 316b continues to play to User2 and message 316c continues to play to User1.

Although a specific embodiment of the present invention has been described, it will be understood by those of skill in the art that there are other embodiments which are equivalent to the described embodiment. Accordingly, it is to be understood that the invention is not to be limited by the specific illustrated embodiment, but only by the scope of the appended claims.

What is claimed is:

1. A method of voice mail messaging in a voice mail system comprising a voice mail mailbox including a plurality of messages and a pointer indicating a message in the mailbox, the method comprising the steps of:

setting the pointer to point to a first message in the voice mail mailbox;

playing the first message to a first user, responsive to a command from the first user;

updating the pointer to point to a second message in the voice mail mailbox; and playing at least a portion of the second message to the second user, while the first message is being played to the first user, responsive to a command from the second user.

2. The method of claim 1, wherein the messages in the mailbox are messages that have not been played to any user.

3. The method of claim 1, wherein the messages in the mailbox are messages that have been saved by a user.

4. A voice mail messaging system comprising:

a message storage device including a voice mail mailbox storing a plurality of messages and a pointer indicating a message in the voice mail mailbox;

a user interface, coupled to the message storage device, playing voice mail messages from the message storage device and prompts to users and receiving inputs from users;

a memory, storing program instructions and data; and a controller, coupled to the user interface, the message storage device and the memory, executing program instructions from the memory to perform the steps of:

setting the pointer to point to a first message in the voice mail mailbox;

playing the first message to a first user, responsive to a command from the first user;

updating the pointer to point to a second message in the voice mail mailbox; and playing at least a portion of the second message to the second user, while the first message is being played to the first user, responsive to a command from the second user.

5. The system of claim 1, wherein the messages in the mailbox are messages that have not been played to any user.

6. The system of claim 1, wherein the messages in the mailbox are messages that have been saved by a user.

7. The system of claim 1, wherein the message storage device is a disk drive.

8. A voice mail messaging system comprising:

a voice mail mailbox including a plurality of voice mail messages and a pointer indicating a first message;

a first message playback device, playing the first message to the first user, responsive to a command from the first user;

a pointer update device, updating the pointer to point to a second message in the voice mail mailbox; and a second message playback device, playing at least a portion of the second message to the second user, while the first message is being played to the first user, responsive to a command from the second user.

9. The system of claim 8, wherein the messages in the mailbox are messages that have not been played to any user.

10. The system of claim 8, wherein the messages in the mailbox are messages that have been saved by a user.

* * * * *